United States Patent [19]
Shelton

[11] Patent Number: 5,219,429
[45] Date of Patent: Jun. 15, 1993

[54] HYDRA-LIFT SYSTEM

[76] Inventor: Bill E. Shelton, 1804 Avenue H, Levelland, Tex. 79336

[21] Appl. No.: 927,806

[22] Filed: Aug. 10, 1992

[51] Int. Cl.⁵ ............................................. B66F 7/04
[52] U.S. Cl. ................................................. 254/423
[58] Field of Search .................... 254/423, 93 R, 93 H

[56] References Cited
U.S. PATENT DOCUMENTS

| | | | |
|---|---|---|---|
| 2,162,931 | 6/1939 | Bissell | 254/423 |
| 2,233,732 | 3/1941 | Campbell | 254/423 |
| 2,251,293 | 8/1991 | Schwartz et al. | 254/423 |
| 3,301,519 | 1/1967 | Dommann et al. | 254/93 R |
| 3,734,464 | 5/1973 | Bushnell | 254/93 R |
| 3,918,683 | 11/1975 | Millar | 254/93 R |
| 4,037,821 | 7/1977 | Greene | 254/93 R |
| 4,150,813 | 4/1979 | Mena | 254/423 |
| 4,174,094 | 11/1979 | Valdespino et al. | 254/423 |

*Primary Examiner*—Robert C. Watson

[57] ABSTRACT

An improved vehicular mounted jacking system controllably raises or lowers a portion of a vehicle relative to the terrain on which the vehicle is supported. Multi-chambered telescoping hydraulic jacks are mounted on the frame of the vehicle close to each of the several replaceable wheels. Each hydraulic jack is vertically oriented relative to the supporting terrain to lift a portion of the vehicle relative to the supporting terrain allowing removal of the desired wheel. Hydraulic power from the vehicle is coupled in communication with each of the multi-chambered telescoping hydraulic jacks to provide hydraulic fluid under pressure for actuating and extending the hydraulic jacks. A valved manifold is also disposed in fluid communication between the jacks and the hydraulic power source. The valves of the manifold are controlled to selectively extend or retract one or more of the hydraulic jacks.

16 Claims, 2 Drawing Sheets

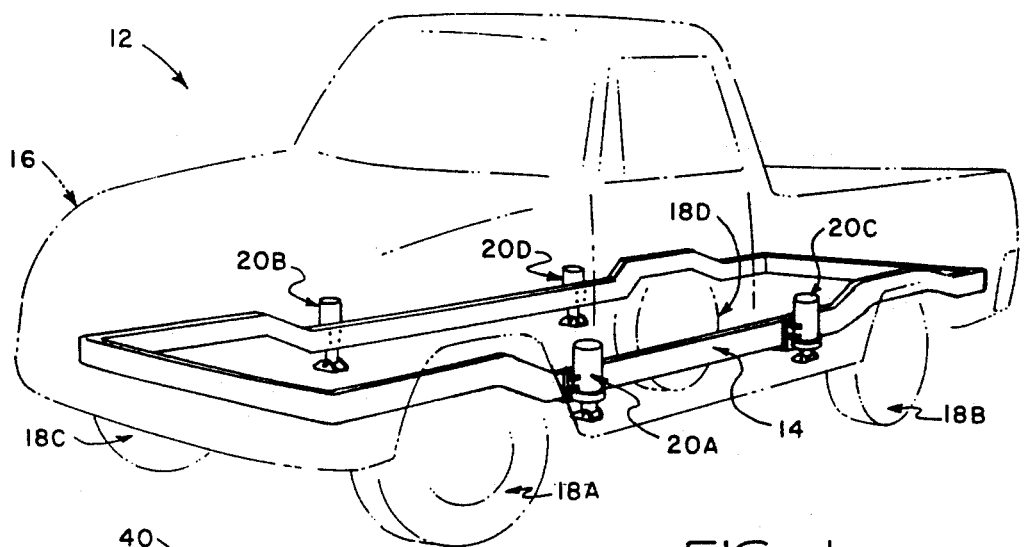
FIG. 1
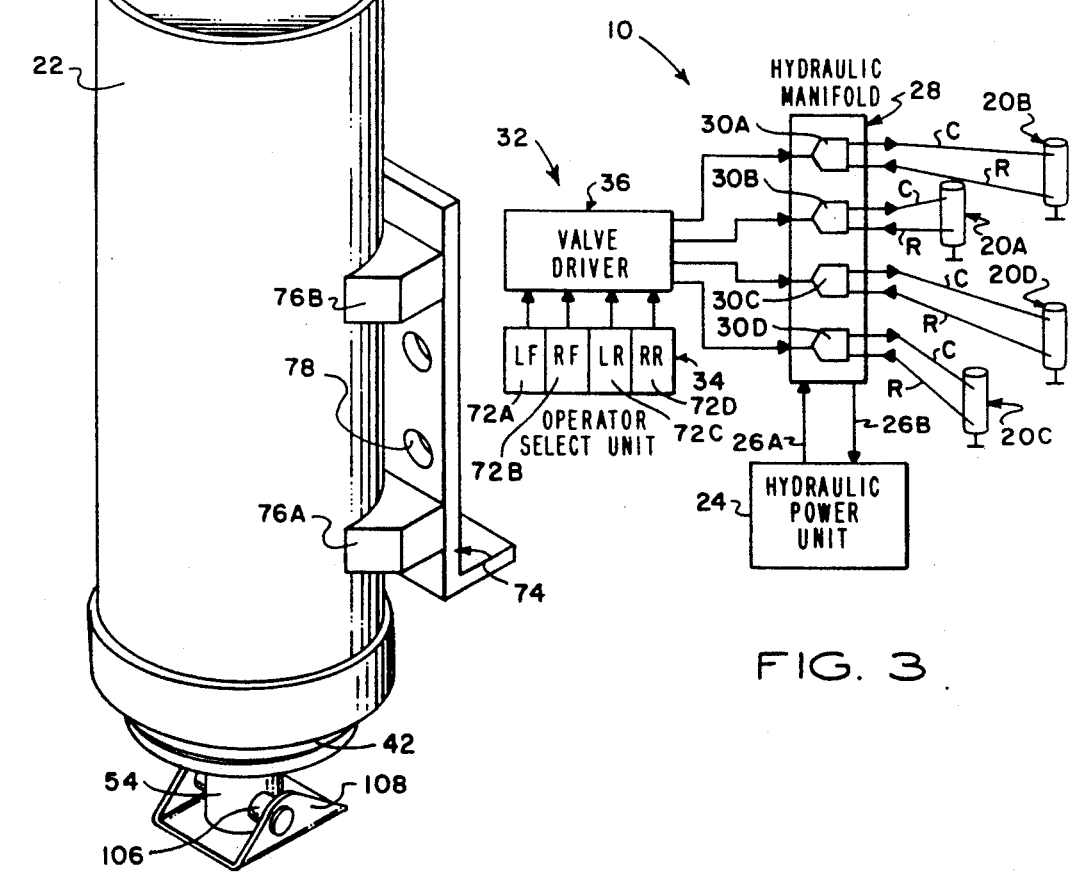
FIG. 2
FIG. 3

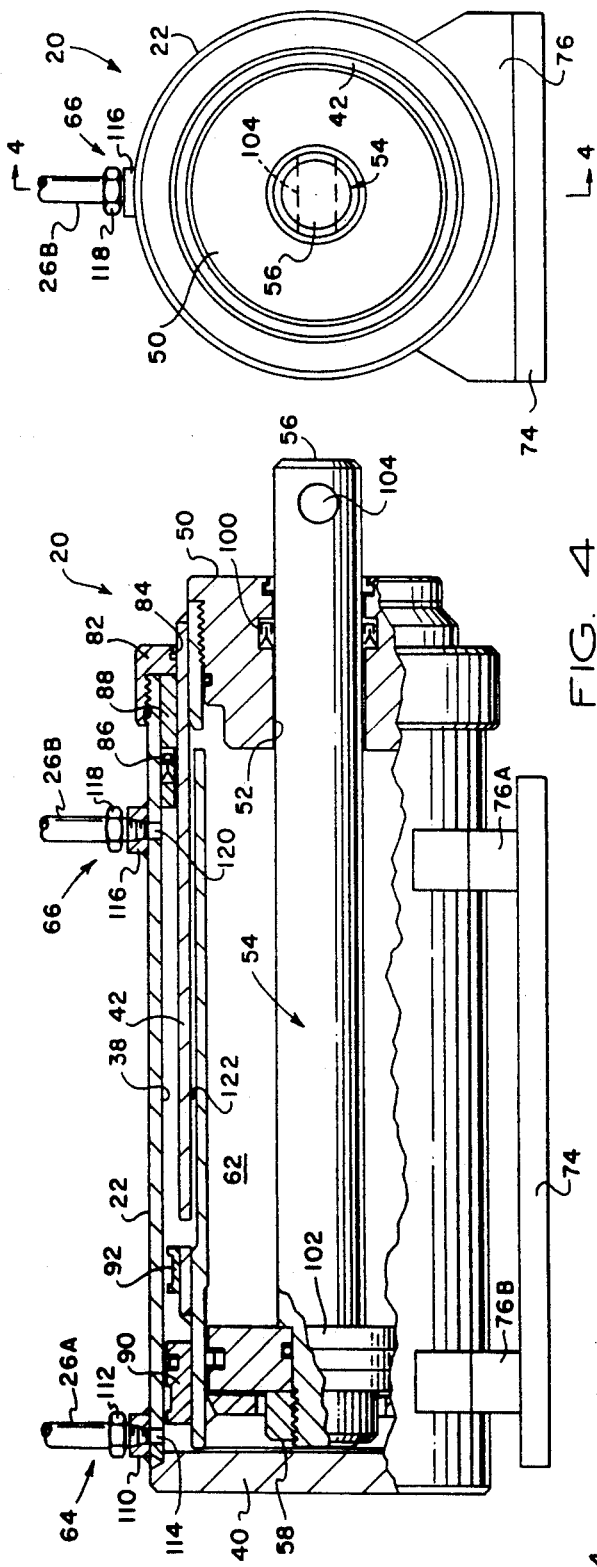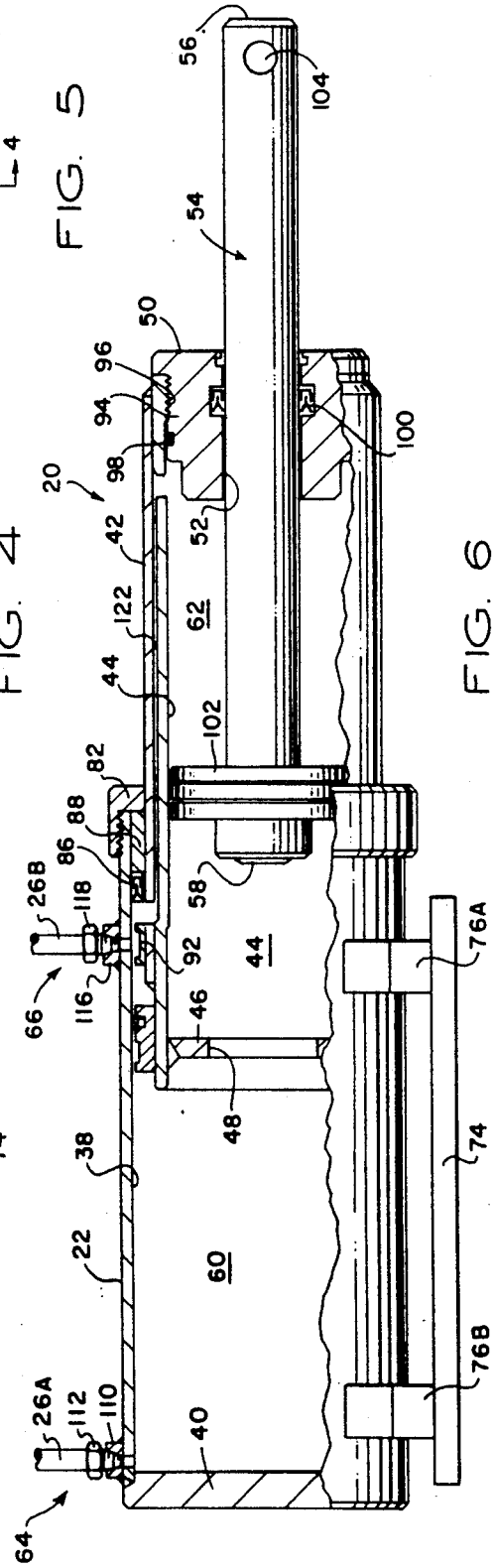

HYDRA-LIFT SYSTEM

FIELD OF THE INVENTION

This invention relates generally to vehicular jacking systems and more specifically to a multi-chambered, telescoping hydraulic jack system for automobiles or trucks.

BACKGROUND OF THE INVENTION

Vehicles such as trucks and automobiles may be equipped with attached, self-contained or integrated jacking systems. The most common use of such jacks is to elevate one side of the car or truck for removal and replacement of a flat tire. Before the integrated jacking systems, a portable, manually operable jack matched to the specific type of vehicle was provided. The operator would normally remove the jack from its storage position in the car's trunk and attach the jack to the car's frame. The operator would then manually crank the jack to free the flat tire from contact with the ground. Subsequently, the operator would remove and replace the elevated tire and crank down the jack to return the tire to contact with the ground. The portable jack would then be removed from its jacking position and returned to storage in the car's trunk.

Occasionally, portable jacks may be lost or misplaced, and will not be available for service. At other times, a portable jack will be stored in the trunk of the car beneath other items such as luggage. In such situations, the operator must unpack the car's trunk, remove the jack, and then repack the trunk.

The attached, deployable integrated jacks are generally mounted to the frame of the vehicle, and through extension of the jack, a selected portion of the vehicle is elevated above the supporting surface or terrain. The operator may then remove the flat tire and replace it without need of the separate, portable jack normally stored in the trunk of the vehicle.

Another use for an integrated jacking system is for levelling a vehicle parked on an uneven surface. Such jacks are commonly used with recreational vehicles for providing a level floor surface. Such jacks may also be used in combination with excavation machines which must be stabilized during operation.

DESCRIPTION OF THE PRIOR ART

An integrated jacking system mounted to the body or frame of the vehicle has been proposed to overcome the difficulties associated with portable jacks. However, hydraulic and pneumatic lifting jacks of conventional jacking systems have included only a single, fixed piston chamber and a single extending piston shaft. Since the jack in its retracted position must provide adequate ground clearance during travel, the lowest portion of the jack must be retracted at least to the undercarriage clearance level. Thus, the length of the jack having a single piston shaft had to be at least as long a the minimum ground clearance of the vehicle, and in practice had to be considerably longer to provide adequate jacking height. This required a piston cylinder of considerable size and bulk, making it difficult to mount internally of the car body.

Accordingly, there exists a need for a compact, hydraulic jack system wherein the hydraulic piston or cylinder is shorter, yet provides sufficient lifting ability. A need thus exists for an improved hydraulic cylinder wherein the hydraulic cylinder is reduced in size so that it can be conveniently mounted within the vehicle body.

Typical integrated jacking systems for vehicles are shown in U.S. Pat. No. 4,150,813 and U.S. Pat. No. 4,993,688.

SUMMARY OF THE INVENTION

The present invention provides an improved vehicle mounted, integrated jacking system to controllably raise or lower a portion of a vehicle relative to the terrain on which the vehicle is supported. It overcomes the foregoing hydraulic jack size limitations by utilizing a compact, multi-chambered, telescoping hydraulic jack which can be mounted directly onto the frame of a vehicle. Preferably, the telescoping hydraulic jack of the present invention is mounted on the frame or body of the vehicle adjacent to each of its replaceable wheels. The hydraulic jack is vertically oriented relative to the supporting terrain to lift a selected portion of the vehicle relative to the supporting terrain, thereby allowing removal of the desired wheel. Hydraulic power means are coupled in communication with each of the multi-chambered telescoping hydraulic jacks to provide hydraulic fluid under pressure for actuating and extending the hydraulic jacks. A valved manifold is coupled in fluid communication between the jacks and the hydraulic power source, and the valves of the manifold are controlled to selectively extend or retract one or more of the hydraulic jacks.

Each of the multi-chambered, telescoping hydraulic jacks includes an outer cylindrical body that is mounted to the vehicle frame. The outer cylindrical body is formed having a central bore with one end which is sealed. An inner cylindrical body is movably mounted concentrically within the bore of the outer cylindrical body. A piston rod is mounted within the bore of the inner cylindrical body and has an end for engaging a supporting surface.

The telescoping hydraulic jack is extended by controllably filling the outer chamber formed between the sealed end of the bore of the outer cylindrical body and the sealed end of the rod with the hydraulic fluid under pressure. The pressurized fluid moves the inner cylindrical body and piston rod into an extended position in which it engages the supporting surface and raises the desired portion of the vehicle relative to the supporting surface.

When the operator desires to retract the telescoping hydraulic jack, the inner chamber that is formed within the bore of the inner cylindrical body between the sealed end of the rod and the opposite end of the inner cylindrical body that has the central axial opening is filled under pressure with hydraulic fluid. The pressurized fluid in the inner chamber moves the inner cylindrical body and rod into the retracted position and correspondingly drains the hydraulic fluid from the outer chamber. With the jack in the retracted position, the jack is returned to the normal storage position out of contact with the ground and permits the full functional use of the car.

Operational features and advantages of the present invention will be appreciated by those skilled in the art upon reading the detailed description which follows with reference to the attached drawings, wherein:

BRIEF DESCRIPTION OF THE DRAWINGS

FIG. 1 is a perspective view in phantom of a pickup truck that is provided with the multi-chambered, telescoping hydraulic jacks of the present invention;

FIG. 2 is a side elevation illustrating a single multi-chambered, telescoping hydraulic jack of the present invention;

FIG. 3 is a schematic diagram of the hydraulic system with the control manifold and power units for use in the instant invention;

FIG. 4 is a partial cross-sectional side view of the multi-chambered, telescoping hydraulic jack in a retracted position taken along line 4—4 of FIG. 5;

FIG. 5 is an end view of the jack; and

FIG. 6 is a partial cross-sectional view of the hydraulic jack similar to FIG. 4 showing the invention in a partly extended position.

DETAILED DESCRIPTION OF THE PREFERRED EMBODIMENT

In the description which follows, like parts are indicated throughout the specification and drawings with the same reference numerals, respectively. By way of example, the invention is described in combination with a wheeled vehicle such as a light pickup truck. It will be appreciated, however, that the multi-chambered jacking assembly of the present invention may be used in combination with vehicles including recreational vehicles and other vehicles which include a hydraulic power system, for example, mobile cranes, transport trailers, utility trucks, farm vehicles and the like.

Referring now to the drawings, there is shown an exemplary integrated jacking system 10 incorporating the present invention. The jacking system controllably raises and lowers a portion of a vehicle 12 relative to the terrain on which the vehicle 12 rests or is supported. Generally, the vehicle 12 has a frame member 14 welded to or bolted to an outer body 16 and having replaceable wheels 18A, 18B, 18C and 18D suspended from the frame 14.

Multi-chambered telescoping hydraulic jacks 20 (20A, 20B, 20C and 20D) are mounted on the frame 14 internally of the vehicle body 16 and are preferably in proximity to each of the wheels subject to replacement. It will be understood that the frame member 14 may be of "unitized" construction in which it is welded to the body 16, and that the jacks 20 may also be attached to the body 16 as well. For convenience, the exemplary embodiment is illustrated and described with reference to attachment of the jacks 20 to the vehicle frame 14. Each jack is oriented in essentially a vertical orientation relative to the supporting terrain. The multi-chambered hydraulic jacks have extensible pistons mounted within an outer cylindrical body 22 which is adapted for attachment to the frame 14 of the vehicle.

A hydraulic power unit 24 provides a hydraulic fluid under pressure through charge and return conduits 26A, 26B for controllably actuating the hydraulic jacks 20. Ideally, in cases where there are two or more multi-chambered hydraulic jacks 20, a manifold 28 that has valves 30A, 30B, 30C and 30D is coupled in fluid communication to the jacks 20A, 20B, 20C and 20D by charge and return conduits C, R. An operator control unit 32, including an operator select unit 34 and valve driver 36, cooperates to selectively activate the valves 30A, 30B, 30C and 30D, thereby controlling the extension or retraction of the selected multi-chambered pistons 20.

Each multi-chambered, telescoping hydraulic jack 20 generally includes an outer cylindrical body 22 that is adapted for mounting to the vehicle 12 and more particularly to the frame 14 of the vehicle 12. The outer cylindrical body 22 is generally formed having a central bore 38 which is sealed by an end plate 40. Preferably, the end plate 40 is the upper end or the highest end of the piston cylinder 20 when it is in its installed vertical orientation.

An inner cylindrical body 42 is disposed concentrically within the bore 38 of the outer cylindrical body 22. The inner cylindrical body 42 is movable relative to the outer cylindrical body 22, preferably in the direction that approaches the ground or supporting surface. The inner cylindrical body 42 also has a central bore 44, closed on one end by end plate 46 which is intersected by a flow passage 48. The interior end plate 46 is preferably the uppermost end of the inner cylindrical body 42 and is coupled in slidable engagement against the central bore 38 of the outer cylindrical body 22. The end plate 50 of the inner cylindrical body's bore opposite to the end plate 46 generally has a central, sealable axial opening or passage 52.

A piston rod 54 is mounted concentrically within the bore 44 of the inner cylindrical body 42 and has an outer end 56 for engaging the supporting surface. The surface engaging outer end 56 is the end of the extensible piston rod 54 closest to the ground or the supporting surface to contact the ground when the multi-chambered jack 20 is extended. The rod 54 is movable relative to the inner cylindrical body 42, which itself is movable relative to the outer cylindrical body 22. The rod 54 extends through the sealable axial opening 52 in the inner cylindrical body 42. The rod further has an inner end 58 which is received in the flow passage 48 in the fully retracted piston (FIG. 4).

An outer chamber 60 is formed between the sealed end 40 of the outer cylindrical body 22 and the end portion 58 of the rod 54. Similarly, an inner chamber 62 is formed within the bore 44 of the inner cylindrical body 42 between the sealed end 58 of the rod 54 that is mounted within the bore 44 of the inner cylindrical body 42 and the end plate 50.

A bidirectional outer port 64 mounted on the outer cylindrical body 22 is coupled in fluid communication with the hydraulic power unit 24 and the outer chamber 60 to communicate the hydraulic fluid into and out of the outer chamber 60. A comparable bidirectional inner port 66, mounted to the fixed outer cylindrical body 22, is also coupled in fluid communication with the hydraulic power unit 24 and the inner chamber 12 to communicate the hydraulic fluid into and out of the inner chamber 62.

When the outer chamber 60 is controllably charged with the hydraulic fluid under pressure, the pressurized fluid moves the inner cylindrical body 42 and rod 54 into an extended position (FIG. 6) out of the outer fixed cylindrical body 22 to engage the ground or supporting surface and to raise a portion of the vehicle 12 relative to the ground. Alternatively, to lower the vehicle 12 from its raised position, the inner chamber 62 is controllably charged with the hydraulic fluid under pressure. Hydraulic pressurization of the inner chamber 62 moves the inner cylindrical body 42 and rod 54 into a retracted position 70 and thereby displaces the hydraulic fluid from the outer chamber 60.

In the preferred embodiment, a multi-chambered jack 20 is mounted in close proximity to each of the wheels 18A, 18B, 18C and 18D of the vehicle 12. A pair of jacks is located on each side of the car 12 in the area between the front set of wheels 18A, 18C and the rear set of wheels 18B, 18D such that a jack 20 is located in each quadrant of the vehicle in a uniform, symmetrical arrangement. It can be seen by reference to the vehicle 12 of FIG. 1 that the front end will be raised above the support surface by extending the jack 20A, which raises the corresponding quadrant of the vehicle 12 and shifts the weight of the vehicle to the remaining three tires 18B, 18C and 18D. Upon full extension of the jack, the corresponding wheel can be removed and replaced with a spare tire. By careful placement of the fixed jacks 20 in relationship to the wheels, one has the ability to raise any desired portion of the vehicle 12, so long as the selected multi-chambered jack 20 is extended with sufficient force or pressure for the frame to be elevated.

In the schematic diagram shown in FIG. 3, the hydraulic power unit 24 is connected in bidirectional communication with the hydraulic manifold 28. In the preferred embodiment, the hydraulic power unit 24 is the hydraulic power steering system of the truck 12, which uses the vehicle's engine for its power source. The hydraulic power unit 24 and manifold 28, acting together as a reservoir for the hydraulic fluid, selectively actuates one or more of the multi-chambered hydraulic jacks 20 by means of selectively controlling the appropriate valves 30A, 30B, 30C and 30D. The opening and closing of an individual valve 30A, 30B, 30C or 30D selectively fills or pressurizes the outer or inner chamber of the desired jack 20.

The operator control unit 32 includes an operator select unit 34 to controllably select or operate one or more of the plurality of multi-chambered hydraulic jacks 20. Typically, with a four-wheeled vehicle such as the pickup truck depicted in FIG. 1, there would be a left front (LF) jack 20A, a right front (RF) jack 20B, a left rear (LR) jack 20C, and a right rear (RR) jack 20D. Each of the jacks is assigned a corresponding select switch 72A, 72B, 72C and 72D. The operator select switch 72A, 72B, 72C and 72D of unit 34 further controls the functioning of the valve driver 36 to selectively operate the individual valves 30A, 30B, 30C and 30D of the hydraulic manifold 28.

By cooperation of the hydraulic power unit 24, the operator control unit 32 and the valved hydraulic manifold 28, the vehicle operator is able to selectively control a single multi-chambered hydraulic jack 20 to extend the jack 68 or, alternatively, to replace the jack into its retracted position 70.

The multi-chambered, telescoping hydraulic jack 20 of the present invention generally includes an outer cylindrical body 22 constructed from a metal such as steel suitable for withstanding comparatively high pressures. The outer cylindrical body 22 is adapted to be mounted on the vehicle and particularly to the frame of the vehicle. A mounting bracket 74 is secured to the outer cylindrical body 22 by arms 76A, 76B. Holes 78 through the mounting bracket are suitable for bolt or screw attachment to the vehicle's frame 14 as is shown generally in FIG. 1.

One end of the outer cylindrical body 22 is sealed preferably by a solid disk 40 in threaded engagement with the outer cylindrical body 22. The opposite end of the outer cylindrical body 22 preferably has a threaded cap 82 for attachment to the outer cylindrical body 22.

The threaded cap 82 on the opposite end has a central axial opening 84 for passage of the inner cylindrical body 42, and means for hydraulically sealing the inner chamber 62. Such hydraulic seal is provided by a seal 86 and stop block 88 concentric to the inner cylindrical body 42.

The inner cylindrical body 42 is mounted concentrically within the bore 38 of the outer cylindrical body 22. The inner cylindrical body 42 is movable relative to the outer cylindrical body 22 going into and out of the outer chamber 60. The inner cylindrical body 42 is also constructed of a material such as steel which is suitable for withstanding the design load. The inner cylindrical body 42 is formed having a central bore 44 with the innermost end of the outer cylindrical body having a perforated end 46. The inner cylindrical body 42 has sealing ring 90 fixed to the exterior of the inner cylindrical body which forms a movable hydraulic seal with relationship to the interior of the central bore 38 of the outer cylindrical body 22. Preferably, a circumferential stop ring 92 is fixed to the exterior of the inner cylindrical body 42 to engage the stop block 88 of the outer cylindrical body 22 to prevent the inner cylindrical body 42 from becoming disengaged from the outer cylindrical body 22.

The end 50 of the inner cylindrical body opposite to the perforated end has a central, sealable axial opening 52. It is preferable that an axial opening cap 94 engage the inner cylindrical body with threads 96 and also sealing cap-rings 98 to prevent hydraulic fluid leakage.

The piston rod 54 is mounted concentrically within the bore 44 of the inner cylindrical body 42 and has an outer end 56 for engaging the supporting surface or terrain. The piston rod 54 is movable relative to the inner cylindrical body 42. The piston rod 54 further extends through the sealable axial opening in the inner cylindrical body 42 and is in a movable sealed relationship by means of annular seals 100. The inner end 58 of the piston rod 54 has a sealing ring 102 in a movable sealed relationship with the bore 44 of the inner cylindrical body 42.

The surface engaging end 56 of the rod 54 is generally formed having a passage 104 for holding a pin 106 securing a foot plate 108. The foot plate 108 is constructed so as to spread the weight that is supported or suspended over a larger surface area on which the foot contacts the supporting surface. The pin 106 also permits the pivotal movement or rotation of the foot 108 to adapt to the variance of the underlying support surface or terrain.

The expandable outer chamber 60 is formed between the sealed end 40 of the bore 38 of the outer cylindrical body 22 and the sealed end 58 of the rod 54 that is mounted within the bore 44 of the inner cylindrical body 42. The outer chamber 60 includes the area of the bore 44 of the inner cylindrical body 42 between the perforated end 46 and the sealable inner end 58 of the rod 54. The volume of the outer chamber 60 increases as the multi-chambered telescoping piston 20 is extended and correspondingly decreases when the multi-chambered piston 20 is retracted.

A comparable inner chamber 62 is also formed within the bore 44 of the inner cylindrical body 42 between the sealed end 58 of the rod 54 that is mounted within the bore 44 of the inner cylindrical body 42 and the opposite end 50 of the inner cylindrical body 42 that has the central axial opening 52. Accordingly, the volume of the inner chamber 62 expands to its maximum volume when the multi-chambered piston 20 is in its fully retracted position 70 and decreases to its minimum size when the piston 20 is in its fully extended position (FIG. 6).

The inner 62 chamber and outer 60 chamber cooperate in an inverse relationship such that when the multi-chambered piston 20 is extended, the outer chamber's volume expands while the inner chamber's volume decreases. When the multi-chambered piston 20 is retracted, the inner chamber volume expands to its maximum while the outer chamber's volume shrinks to its minimum size. The amount of hydraulic fluid or pneumatic fluid occupying either of the inner or outer chamber is in direct proportion to the volume of the inner or outer chamber.

The bidirectional outer port 64 is attached to the outer cylindrical body 22 and is in flow communication with the hydraulic power unit 24 and the outer chamber 60. The outer port 64 communicates hydraulic fluid into and out of the outer chamber 60. Typically, the outer port 64 includes a threaded outer seat 110, fluid lines 26A and a connecting plug 112 to mate the hydraulic flow lines to the threaded seat 110. An aperture 114 through the outer cylindrical body 22 communicates the fluid into the outer chamber 60. Typically, the flow lines 26 are either metallic tubing or other types and rubberized, reinforced tubing.

Similarly, a bidirectional inner port 66 is affixed to the outer cylindrical body 22 to communicate the hydraulic or pneumatic fluid into and out of the inner chamber 62. The inner port 66 is in communication with the hydraulic power unit 24 and the inner chamber 62. Generally, the inner port 66 includes the threaded inner seat 116, the corresponding fluid lines 26B and compatible threaded connecting plug 118. An aperture 120 through the outer cylindrical body passes the fluid into the inner chamber 62.

Preferably, the inner cylindrical body 42 is formed with an annulus 122 for the free flow of the hydraulic or pneumatic fluid from the portion of the inner chamber 62 that is exterior to the interior cylindrical body 42 with the portion of the inner chamber 62 that is interior to the inner cylindrical body 42.

It should be understood that during operation of the integrated jacking system 10 in which the hydraulic power unit or pump 24 provides power steering for the vehicle 12, the engine should be on or running so that the pump is fully energized, thereby utilizing the power supply of the vehicle 12 to operate and energize the pump 24 while the vehicle 12 is being raised or lowered.

The operator first identifies or selects the multi-chambered piston 20 which corresponds with the wheel 18A, 18B, 18C or 18D to be removed and replaced. Having made the selection, the operator engages the corresponding switch 72A, 72B, 72C or 72D of the operator select unit 34. The engaging or movement of a selected switch 72A, 72B, 72C or 72D to select either the extension or retraction mode correspondingly activates the valve driver 36 to selectively operate the individual valves 30A, 30B, 30C or 30D of the hydraulic manifold 28 to pump hydraulic fluid under pressure into either the outer port 64 or the inner port 66 of the corresponding hydraulic jack 20. If the valve for pressurizing the outer port 64 is activated and sufficient hydraulic fluid pressure is supplied, the fluid flows into the outer chamber 60. The increased supply of pressurized hydraulic fluid pushes against the walls of the outer chamber 60 extending the inner cylindrical body 42 and the rod 54 out of the relatively fixed outer cylindrical body 22. Alternatively, if the valve associated with the inner port 66 is opened allowing fluid flow under pressure to the inner chamber 62, the inner chamber 62 receives the pressurized fluid and expands. The expansion of the inner chamber 62 drains the fluid from the outer chamber 60 and moves the inner cylindrical body 42 and the rod 54 into the retracted position 70.

The operator typically would manually control the switch until the jack 20 is sufficiently extended and the car 12 is lifted to the desired height above the supporting surface or terrain. Once the wheel to be replaced is raised out of contact with the surface, it is recommended that the operator properly chock the vehicle to prevent undesired movement of the vehicle and the flat tire can then be replaced according to normal procedure.

Once the flat tire has been replaced, the valve permitting the pressurized flow into the inner chamber can be activated causing the retraction of the extensible portion of the multi-chambered jack into its retracted position and out of contact with the supporting surface.

Since many changes could be made in the above construction and many apparently widely different embodiments of this invention could be made without departing from the scope thereof, it is intended that all matter contained in the drawings and specification shall be interpreted as illustrative and not in a limiting sense.

What is claimed is:

1. A vehicular mounted jacking system to controllably raise and lower a portion of a wheeled vehicle relative to the terrain on which it is supported, comprising:
   a plurality of multi-chambered, telescoping hydraulic jacks attached to the vehicle in proximity to its wheels in an essentially vertical orientation relative to the supporting terrain for lifting a portion of the vehicle relative to the supporting terrain;
   a hydraulic power means coupled in communication with said multi-chambered, telescoping hydraulic jacks for providing a hydraulic fluid under pressure to actuate said hydraulic jacks;
   manifold means having valves disposed in fluid communication between said jacks and said hydraulic power means;
   control means for selectively activating said valves; and
   said multi-chambered, telescoping hydraulic jack further comprising:
     an outer cylindrical body for mounting to the vehicle, said outer cylindrical body formed having a central bore;
     an inner cylindrical body mounted concentrically within the bore of said outer cylindrical body, said inner cylindrical body being movable relative to said outer cylindrical body and having a central bore;
     a rod mounted concentrically within the bore of said inner cylindrical body having an outer end for engaging the supporting surface, said rod being movable relative to said inner cylindrical body and extending through said sealable axial opening in said inner cylindrical body;
     an outer chamber formed between the bore of the outer cylindrical body and said rod;
     an inner chamber formed within the bore of the inner cylindrical body between said rod;
     a bidirectional outer port means coupled in fluid communication with the hydraulic power means and the outer chamber for communicating the hydraulic fluid into and out of the outer chamber; and, a bidirectional inner port means coupled in fluid communication with the hydraulic power means and the inner chamber for communicating the hydraulic fluid into and out of the inner chamber;

whereby the outer chamber is controllably filled with the hydraulic fluid under pressure to move the inner cylindrical body and rod into an extended position engaging the supporting surface and to raise a portion of the vehicle relative to the supporting surface and, alternatively, the inner chamber is controllably filled with the hydraulic fluid under pressure to move the inner cylindrical body and rod into a retracted position and draining the hydraulic fluid from said outer chamber.

2. The vehicular mounted jacking system of claim 1, including a foot plate attached to said rod for distributing the vehicle weight over a larger area of the supporting terrain.

3. The vehicular mounted jacking system of claim 2, wherein said foot plate is pivotally mounted on said outer end of the rod.

4. The vehicular mounted jacking system of claim 1, wherein said hydraulic power means is a power steering pump for the vehicle.

5. In a vehicular mounted jack assembly for controllably raising and lowering a portion of a wheeled vehicle, a jack mounted on the vehicle, jack control means for selectively activating said jack, and hydraulic power means in communication with said jack for providing a hydraulic fluid under pressure, the hydraulic jack comprising:

an outer cylindrical body for mounting on the vehicle; said outer cylindrical body formed having a central bore with one end sealed;

an inner cylindrical body mounted concentrically within the bore of said outer cylindrical body; said inner cylindrical body being movable relative to said outer cylindrical body; said inner cylindrical body formed having a central bore with one end being perforated, and an opposite end having a central, sealable axial opening;

a rod mounted concentrically within the bore of said inner cylindrical body having an outer end for engaging the supporting surface; said rod being movable relative to said inner cylindrical body; said rod extending through said sealable axial opening in said inner cylindrical body; an inner end of said rod being in a movable sealed relationship to said bore of the inner cylindrical body;

an outer chamber formed between said sealed end of the bore of the outer cylindrical body and the sealed end of the rod mounted within the bore of the inner cylindrical body;

an inner chamber formed within the bore of the inner cylindrical body between the sealed end of the rod mounted within the bore of the inner cylindrical body and the opposite end of the inner cylindrical body having the central axial opening;

a bidirectional outer port means in communication with the hydraulic power means and the outer chamber for communicating hydraulic fluid into and out of the outer chamber; and, a bidirectional inner port means in communication with the hydraulic power means and the inner chamber for communicating hydraulic fluid into and out of the inner chamber;

whereby the outer chamber is controllably filled with the hydraulic fluid under pressure to move the inner cylindrical body and rod into an extended position engaging the supporting surface and to raise a portion of the vehicle relative to the supporting surface and, alternatively, the inner chamber is controllably filled with the hydraulic fluid under pressure to move the inner cylindrical body and rod into a retracted position and draining the hydraulic fluid from said outer chamber.

6. The vehicular mounted jack assembly of claim 5, wherein said outer end of the rod is adapted to include a foot plate for distributing weight over a larger area of the supporting terrain of the supporting surface.

7. The vehicular mounted jack assembly of claim 6, wherein said foot plate is pivotally mounted on said outer end of the rod.

8. The vehicular mounted jack assembly of claim 5, wherein the hydraulic power means is a power steering pump for the vehicle.

9. The vehicular mounted jack assembly of claim 5, wherein the wheels of the wheeled vehicle are a plurality of replaceable wheels mounted on the frame of the vehicle, and said hydraulic jack is adapted for mounting on the frame of the vehicle in proximity to said wheels.

10. The vehicular mounted jack assembly of claim 5, wherein the jack control means further includes manifold means having valves disposed in fluid communication between said hydraulic jack and said hydraulic power means; and manifold valve control means for selectively activating said valves.

11. A vehicular mounted jack assembly to controllably raise and lower a portion of a wheeled vehicle, comprising:

at least one multi-chambered, telescoping hydraulic jack mounted on the vehicle in an essentially vertical orientation relative to the supporting surface for lifting the vehicle relative to the supporting surface;

a hydraulic power means coupled in communication with said multi-chambered, telescoping hydraulic jacks for providing a hydraulic fluid under pressure to actuate said hydraulic jacks; and said multi-chambered, telescoping hydraulic jack further comprising:

an outer cylindrical body for mounting to the vehicle; said outer cylindrical body formed having a central bore with one end sealed;

an inner cylindrical body mounted concentrically within the bore of said outer cylindrical body; said inner cylindrical body being movable relative to said outer cylindrical body; said inner cylindrical body formed having a central bore with one end being perforated, and an opposite end having a central, sealable axial opening;

a rod mounted concentrically within the bore of said inner cylindrical body having an outer end for engaging the supporting surface; said rod being movable relative to said inner cylindrical body; said rod extending through said sealable axial opening in said inner cylindrical body; an inner end of said rod being in a movable sealed relationship to said bore of the inner cylindrical body;

an outer chamber formed between said sealed end of the bore of the outer cylindrical body and the sealed end of the rod mounted within the bore of the inner cylindrical body;

an inner chamber formed within the bore of the inner cylindrical body between the sealed end of the rod mounted within the bore of the inner cylindrical body and the opposite end of the inner cylindrical body having the central axial opening;

a bidirectional outer port means coupled in fluid communication with the hydraulic power means and the outer chamber for communicating the hydraulic fluid into and out of the outer chamber; and, a bidirectional inner port means coupled in fluid communication with the hydraulic power means and the inner chamber for communicating the hydraulic fluid into and out of the inner chamber;

whereby the outer chamber is controllably filled with the hydraulic fluid under pressure to move the inner cylindrical body and rod into an extended position engaging the supporting surface and to raise a portion of the vehicle relative to the supporting surface and, alternatively, the inner chamber is controllably filled with the hydraulic fluid under pressure to move the inner cylindrical body and rod into a retracted position and draining the hydraulic fluid from said outer chamber.

12. The vehicular mounted jack assembly of claim 11, including a foot plate attached to the outer end of the rod for distributing weight over a larger area of the supporting surface.

13. The vehicular mounted jack assembly of claim 12, wherein said foot plate is pivotally mounted on said outer end of the rod.

14. The vehicular mounted jack assembly of claim 11, wherein said hydraulic power means is a power steering pump for the vehicle.

15. The vehicular mounted jack assembly of claim 11, said hydraulic jacks being adapted for attachment to the vehicle in proximity to said wheels.

16. The vehicular mounted jack assembly of claim 11, wherein a plurality of hydraulic jacks are coupled in fluid communication to a manifold means having valves disposed in fluid communication between said jacks and said hydraulic power means; and manifold valve control means for selectively activating said valves.

* * * * *